United States Patent [19]

Gasau

[11] Patent Number: 4,534,985
[45] Date of Patent: Aug. 13, 1985

[54] CONTINUOUS EXTRACTION PROCESS

[75] Inventor: Jacob Gasau, Yverdon, Switzerland

[73] Assignee: Nestec S.A., Vevey, Switzerland

[21] Appl. No.: 203,852

[22] Filed: Nov. 4, 1980

Related U.S. Application Data

[63] Continuation of Ser. No. 961,716, Nov. 17, 1978, abandoned, which is a continuation of Ser. No. 805,783, Jun. 13, 1977, abandoned.

[30] Foreign Application Priority Data

Jun. 24, 1976 [CH] Switzerland ............... 8065/76

[51] Int. Cl.³ ............... A23F 3/18; A23F 5/26
[52] U.S. Cl. ............... 426/432; 426/434; 426/435; 99/289 R
[58] Field of Search ............... 426/432–435; 99/289 R, 289 T, 289 D, 289 P

[56] References Cited

U.S. PATENT DOCUMENTS

| | | | |
|---|---|---|---|
| 686,689 | 11/1901 | Eshwege | 426/432 |
| 2,853,387 | 9/1958 | Nutting | 426/432 X |
| 3,088,394 | 5/1963 | Thornhill | 99/289 |
| 3,146,108 | 8/1964 | Banks | 426/435 |
| 3,482,989 | 12/1969 | Austin et al. | 426/433 |
| 3,551,164 | 12/1970 | Weaver | 426/433 |
| 3,552,976 | 1/1971 | King | 426/435 X |
| 3,579,350 | 5/1971 | Rudd et al. | 99/289 T X |
| 3,607,297 | 9/1971 | Fasano et al. | 426/435 X |
| 3,700,463 | 10/1972 | Bolt et al. | 426/433 |
| 3,812,273 | 5/1974 | Schmidt | 426/433 |
| 3,995,067 | 11/1976 | Marsh et al. | 426/434 X |

FOREIGN PATENT DOCUMENTS 262263 9/1949 Switzerland .

OTHER PUBLICATIONS

Keppler, Filtration aus Losungsmitteln mit dem BHS--FEST-Druckdrehfilter, C.Z.-Chemie-Technik, vol. 9, (1973), pp. 355-358.
Punnett, Relating Particle Size to Brewing Time, Tea and Coffee Trade Journal, Feb. 1956, pp. 12-13.

Primary Examiner—Joseph Golian
Attorney, Agent, or Firm—Vogt and O'Donnell

[57] ABSTRACT

A process for the continuous extraction of roasted coffee or tea, which comprises introducing dry finely ground coffee or tea at a charging station in the form of a bed with a thickness of from 0.5 to 15 cm and displacing the bed along a closed circuit up to a discharging station by way of at least one extraction station where a stream of extraction liquid is passed through the bed while a pressure gradient of the liquid on the bed is maintained.

18 Claims, 1 Drawing Figure

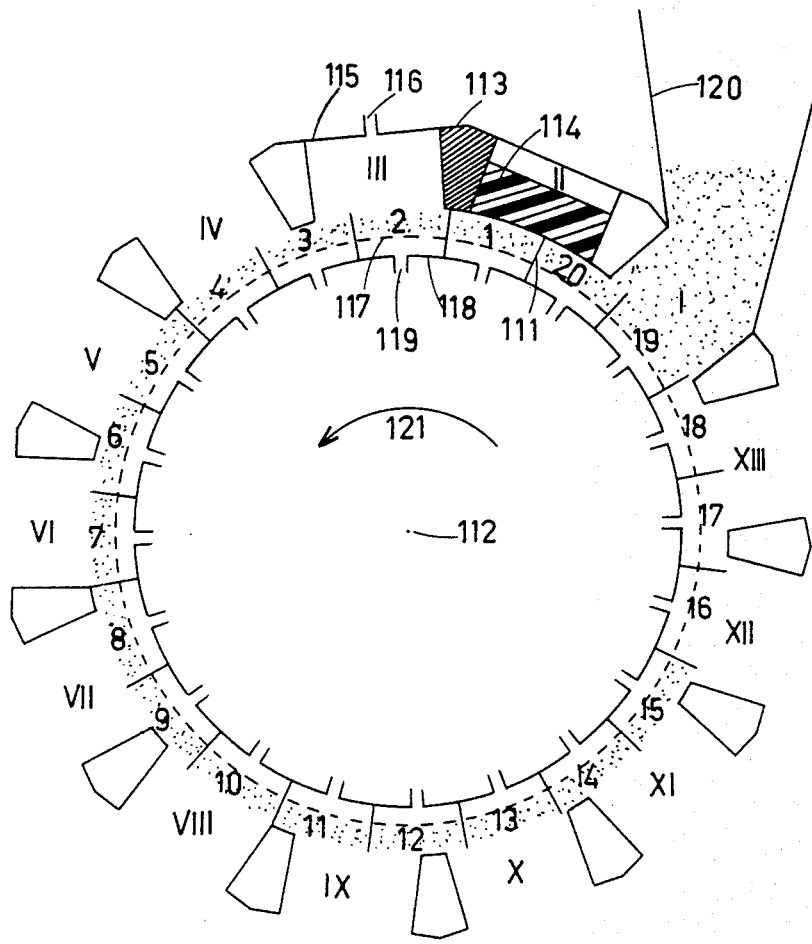

CONTINUOUS EXTRACTION PROCESS

This is a continuation of application Ser. No. 961,716, filed Nov. 17, 1978, now abandoned, which is a continuation of application Ser. No. 805,783, filed June 13, 1977, now abandoned.

This invention relates to a continuous extraction process for roasted coffee or tea.

There are various processes for the continuous extraction of roasted coffee for producing coffee extracts in the form of soluble powders known as soluble instant coffees. In addition to countercurrent extraction in a battery of vertical cells or percolators, other known extraction processes include extraction by means of a spiral conveyor which delivers the coffee upwards along an inclined duct whilst the solvent flows in the opposite direction, the extraction of coffee disposed in the form of a layer on a conveyor belt which circulates below a series of solvent distributors and above a series of collectors, or even extraction in a so-called carousel of open cells which rotate in a pressurised chamber for example. These processes generally comprise at least one so-called hydrolysis step which is intended to dissolve sparingly soluble carbohydrates. This step is effected, for example, in the last cells of a battery or between two extraction cycles of a carousel.

In contrast to these processes characteristic of the instant coffee industry, conventional processes for the extraction of coffee in the home, in restaurants or in canteens, in other words processes for producing what will be referred to hereinafter as domestic coffee, do not comprise a hydrolysis step for the coffe grounds. On the contrary, these processes all tend to avoid this phenomenon. These known processes include those which only use the effect of gravity for causing hot water to flow donwards through a bed of ground coffee disposed on a very fine mesh filter, those which use the pressure which builds up above boiling water in a closed chamber to cause this water to ascend into a hollow column and to pass through a filtering capsule filled with ground coffee or those processes derived from the preceding process which use the vacuum created during cooling of the closed chamber for re-drawing the coffee solution into the chamber.

Although the two categories of processes mentioned above are clearly different from one another, they are both concerned with not losing the aroma, however fleeting, of the coffee. However, whereas the first has seen the development of the art of extracting and reincorporating the aroma during the production and concentration of the soluble coffee extract, the second has seen the beginning of the art of rapid extraction during which the aroma is not given any time to escape. This fundamental difference in the very principle of the extraction process is reflected in the finished or re-constituted product. A cup of coffee obtained by pouring hot water onto a powder-form coffee extract, which may be called a cup of instant coffee, and a cup of domestic coffee each have a distinct character, and if a type of coffee developed from known domestic coffee, namely so-called expresso coffee, is considered, it has an even more distinct character.

The object of the present invention is to produce on a commercial scale a soluble coffee extract in powder-form or a soluble instant coffee which, once reconstituted by the addition of hot water, would have the character of domestic coffee and even of expresso coffee.

The present invention provides a process for the continuous extraction of roasted coffee or tea, which comprises introducing dry finely ground coffee or tea at a charging station in the form of a bed with a thickness of from 0.5 to 15 cm and displacing the bed along a closed circuit up to a discharging station by way of at least one extraction station where a stream of extraction liquid is passed through the bed whilst a pressure gradient of the liquid on the bed is maintained.

By this process, it is possible continuously to extract finely ground coffee, namely roasted coffee size-reduced into particles with a characteristic diameter according to Rosin, Rammler and Sperling ($d'$) of as small as 0.25 mm, in a very short time, namely in a time as short as a few tens of seconds for example. These figures contrast with the typical figures of an industrial countercurrent extraction process carried out in a battery of vertical cells or percolators where $d'$-values of the order of 2 to 4 mm are used for total extraction times per cycle of the order of 1 to 2 hours. By virtue of the process according to the invention, it is possible continuously to obtain on an industrial scale a coffee extract comparable in quality with a domestic coffee and even an expresso coffee. The process according to the invention also lends itself to the preparation of tea extracts which all have the characteristics of a good domestic tea prepared by the infusion of commercial-grade tea leaves.

If the batteries of industrial percolators for example are not fed with finely ground roasted coffee, but instead with medium-ground or even coarsely ground roasted coffee, it is because a pile of fine particles having a $d'$-value of the order of a fraction of a millimeter for example offers a very considerable resistance to the penetration of the extraction liquid, this resistance being further increased by the compressing effect of the pile which gives way under the pressure required to overcome it. The process according to the invention enables these difficulties to be overcome on a commercial scale by virtue of the limited thickness of the bed and the pressure gradient maintained on the bed at each extraction station.

For carrying out the process according to the invention, it is possible to use, for example, a filtration apparatus with a filter circulating along a closed path, such as those manufacture and marketed for the chemical industry by the German firm BAYERISCHE BERG-HUTTEN UND SALZWERKE AG (BHS). These machines may be adapted for the present purpose by fixing to them a suitable feed hopper optionally equipped with an air lock in which the oxygen is replaced by an inert gas or $CO_2$, and by adequately connecting the inlet and outlet pipes for the various fluids in question.

If it is desired to prepare a coffee extract, it is possible to use roasted coffee size-reduced into particles from 0.25 to 2 mm in diameter. It is preferred to use coffee size-reduced into particles having a $d'$-value of from 0.6 to 0.9 mm. This finely ground coffee is preferably arranged in the form of a bed from 2 to 5 cm in thickness. The bed may be compacted by applying a pressure to the coffee in the hopper to improve extraction and increase output. The bed may be supported by a single filter or may be situated between two filters selected in dependence upon the particle size and made of stainless steel for example. The bed may be continuously displaced along the circuit comprising several treatment stations without any stoppages at the various stations. The bed may be displaced towards a first extraction station by way of a steam distillation station where a current of steam is passed through the bed, the steam being subsequently condensed and collected, the aroma thus removed being capable of subsequent restoration to the finished product. In order to carry out this steam distillation treatment, a quantity of steam equivalent to from 5 to 20% of the weight of the constituent fee of the bed for example may be passed through the bed. However, this steam distillation step is not absolutely necessary. Several successive extraction posts are preferably provided. They may be connected in parallel or, by contrast, the inlets and outlets for the extraction liquid may be interconnected in such a way that the less concentrated extract emanating from the next extraction post is used as extraction liquid for the preceding post in accordance with the principle of countercurrent extraction. It is possible to use a total extraction time per cycle if there are several successive extraction stations of from 20 seconds to 5 minutes. It is preferred to use a total extraction time of from 1 to 3 minutes. It is advisable to use an extraction pressure sufficient to prevent the extraction liquid from boiling and to compensate the loss of pressure on the bed. It is preferred to use a pressure of the liquid of less than 6 atmospheres gauge upstream of the bed. It is possible to maintain downstream of the bed a pressure equal to or higher than the boiling pressure of the extraction liquid, a higher pressure being able to be maintained by means of a suitable distribution head which, in the case of countercurrent extraction, makes it possible to prevent the various extracts and the distillate, if any, from becoming mixed and to economise on the use of extraction pumps between the extraction stations. The extraction circuit may be fed with an aqueous solvent, particularly water, at a temperature of from 70° C. to 140° C. and preferably a temperature of from 90° C. to 100° C., at a per second rate corresponding to between 2 and 20 times or preferably to between 6 and 10 times the weight of the coffee introduced into the circuit. An extract containing in solution from 1 to 20% by weight and preferably from 2 to 5% by weight of dry material may be removed from the circuit. During this extraction process, from 4 to 30% by weight of the coffee may pass into solution in the extraction liquid. This extraction level is preferably maintained at 18 to 25%. If it is desired to recover at least part of the portion of extract which remains in the bed of coffee on completion of the extraction process, the bed may be displaced towards the discharge station by way of a recovery station where for example a stream of inert gas or compressed air is passed through the bed. At the discharge station, a scraper or a jet of water for example may be used for detaching the grounds adhering to the filter against which they were pressed during the extraction step. Before closing the loop by advancing the filter freed from the grounds to the charging station, the filter may be passed through a washing station where it is sprayed with water for example.

If it is desired to prepare a tea extract, it is possible to use for example commercial-grade black or green tea. It is preferred to use tea in the form of broken or ground leaf of the type prepared for example for placing in individual bags. The particles of tea thus sub-divided have dimensions of the order of a few tenths of a millimeter. This tea may be extracted under conditions comparable with those referred to above for coffee. Extraction levels of the order of 15 to 40% may be obtained. This level is preferably maintained at 50 to 55% which is substantially equivalent to the level of extraction of tea in a domestic cup. An extract containing in solution from 1 to 20% by weight and preferably from 1.5 to 2.5% by weight of dry matter may be removed from the circuit. To this end, the extraction circuit may be fed with an aqueous solvent, particularly water, at a per second rate corresponding to between 5 and 30 times the weight of tea introduced per second into the circuit.

The coffee or tea extract obtained by the process according to the invention may subsequently be concentrated, for example by reverse osmosis and/or low-temperature concentration and/or evaporation in vacuo. It may then be dried, for example by freeze-drying or by spray-drying, to obtain the desired soluble instant coffee or tea.

The process according to the invention may be carried out either as such or in combination with a traditional process for the commercial production of soluble instant coffee. In the latter case, it is possible for example to separate the fines, more especially by winnowing sieving, from the coarse grains of the particles of freshly ground roasted coffee and to subject the fines to extraction by the process according to the invention, the coarse grains being subjected to extraction in a battery of percolators for example.

It is also possible to feed conventional extractors with coffee or tea of a different grade from the coffee or tea used in the process according to the invention, and subsequently to combine the extracts obtained before or after concentration or drying of these extracts. It is also possible to effect only a partial extraction by the process according to the invention and then to complete the extraction process in cells or in suspension for example.

The accompanying drawing diagrammatically illustrates an apparatus for carrying out the process according to the invention in a section taken perpendicularly to its axis of rotation.

The following Examples are given by way of illustration in reference to the accompanying drawing. The percentages and other quantitative ratios represent values by weight.

EXAMPLE 1

The apparatus is a BHS pilot filter consisting essentially of 13 chambers I to XIII arranged in a ring around a mobile drum comprising 20 compartments 1 to 20 separated by radial walls 111 extending parallel to the horizontal axis 112 of the drum. The chambers are separated from one another by radial elements 113 which extend parallel to the axis of the drum, and are open on the drum side. Each chamber I to XIII may be equipped either with a compressed-air actuated sealing piston 114 which rubs against the top of the radial walls, or with a fluid-tight cover 115 through which extends a pipe 116 for the introduction of liquid or gas. Each chamber may also be left open so as to allow free access to the drum. Each compartment 1 to 20 of the drum is open on the chamber side and is provided on the other side with a filter 117 and then with a base 118 traversed by an outlet pipe 119 for liquid or gas connected to a distribution head (not shown).

The chamber situated at the top of the drum is equipped with a filling hopper 120. Then, considering the successive chambers in the direction of rotation 121 of the drum, they are equipped alternately with a sealing piston and with a cover traversed by an inlet pipe in such a way that there are 5 chambers with a piston and 4 chambers with a cover, of which three are extraction chambers (III, V and VII) and one a recovery chamber (IX). After the fifth piston chamber (X), two chambers are left open, the first (XI) giving free access to a scraper intended to scrape the filters of the compartments of the rotary drum in order to remove the spent grounds therefrom, the second (XII) giving free access to a spray nozzle for cleaning the filters. Before the loop is closed back at the filling chamber (I), there remains a final chamber (XIII) which is provided with a sealing piston.

The inlet pipes and pipes emanating from the distribution head are connected in such a way that extraction can take place in countercurrent, i.e. in such a way that the extract emanating from the third extraction chamber (VII), itself fed with pure water, acts as extraction liquid for the second extraction chamber (V), etc., the total extract which is removed from the apparatus being that emanating from the first extraction chamber (III), that in which the product to be extracted arrives in a fresh, dry state. In addition, each of the inlet pipes to the first two extraction chambers (III and V) is made to pass through a heat exchanger or reheater so as to compensate for the losses of heat incurred during the extraction process. At the recovery station in the recovery chamber (IX), carbon dioxide gas is passed under pressure through the spent grounds in order to separate the extract adhering thereto. This extract is combined with the total extract emanating from the chamber III.

The apparatus thus adapted is used for extracting Ceylon tea of so-called inferior quality, i.e. Ceylon tea consisting above all of fragments of stalks and dust of tea leaves. The total surface area of the filters of the 20 compartments amounting to 0.12 m², 6 kg/h of tea forming a 2 cm thick layer on the filters are extracted. The third extraction chamber (VII) is fed with water at a temperature of 97° C. at a rate of 60 l/h. The temperature of the extraction liquids introduced into the second and first extraction chambers (V and III) is adjusted to 92° C. and 82° C., respectively. Respective pressures of 0.3, 0.2 and 0.1 atmospheres gauge prevail at the entrance to the extraction chambers VII, V and III. The rotational speed of the drum is adjusted in such a way that the extraction time is approximately 3 minutes. An extract containing 1.7% of dry material is obtained, corresponding to an extraction level of the tea of 36%.

EXAMPLES 2-4

A BHS drum filter of the type described in Example 1 is used in the same way as described in that Example for extracting Ceylon tea commercially available under the name of BROKEN ORANGE PEKOE FANNINGS (Examples 2 and 3) and Indian tea intended to be used in tea bags (Example 4). These are black teas in the form of broken leaf of which the particles have sizes of the order of a few tenths of a millimeter. Different extractions each lasting a few hours are carried out. The principal conditions under which these extractions are carried out and also the results obtained are shown in the following Table. The other conditions are substantially the same as those reported in Example 1.

|  | Example No. | | |
|---|---|---|---|
|  | 2 | 3 | 4 |
| Feed rate of black tea (kg/h) | 5 | 17 | 5 |
| Feed rate of extractiom water (l/h) | 120 | 360 | 120 |
| Total extraction time (minutes) | 3 | 1 | 5 |

-continued

|  | Example No. | | |
|---|---|---|---|
|  | 2 | 3 | 4 |
| Chamber III | | | |
| Temperature of the extraction liquid (°C.) | 91 | 89 | 91 |
| Pressure on entry (atms gauge) | 0.1 | 0.2 | 0 |
| Chamber V | | | |
| Temperature of the extraction liquid (°C.) | 95 | 94 | 91 |
| Pressure on entry (atms gauge) | 0.4 | 0.2 | 0.2 |
| Chamber VII | | | |
| Temperature of the extraction water (°C.) | 98 | 94 | 98 |
| Pressure on entry (atms gauge) | 0.7 | 1.5 | 0.15 |
| Extraction level (%) | 33 | 27 | 31 |
| Concentration of the extract obtained (%) | 1.4 | 1.4 | 1.5 |

EXAMPLES 5-10

The filter used is a BHS drum filter of the type described in Example 1 and diagrammatically illustrated in the accompanying drawing. Several extractions are carried out on a mixture of ground roasted coffee composed of Nicaraguan, Angolan, Colombian and Kenyan coffees in proportions of 30, 20, 30 and 20%, respectively. To this end, the chamber I is equipped with a feed hopper, the chambers II, IV, VI, VIII, XI and XIII with a sealing piston and the chambers III, V, VII and IX with a fluid-tight cover traversed by a pipe for the introduction of liquid or gas. The chamber XII is left open and the chamber X is connected to chamber IX whilst at the same time being covered by a fluid-tight cover without any pipes extending through it. Carbon dioxide gas is blown under pressure into the chambers IX and X through the inlet pipe of the chamber IX so as to separate from the coffee grounds the extract adhering to them. Water is sprayed in through the open chamber XI onto the drum so as to remove the spent coffee grounds and to rinse the filters.

In addition to these arrangements made for all the extractions which are the subject of Examples 5 to 10, the chambers III, V and VII are connected in four different ways:

(a) in parallel. The three chambers are fed with extraction water. The extracts emanating from chambers III, V, VII, IX and X are combined and collected;

(b) in parallel with steam distillation. The chamber III is fed with steam and the chambers V and VII with extraction water. The extracts emanating from the chambers V, VII, IX and X are combined and collected;

(c) in countercurrent in three stages. The chamber VII is fed with extraction water. The extracts emanating from the chambers VII, IX and X are combined. The chamber V is fed with these extracts after they have been passed through a reheater by means of a pump. The chamber III is fed with the extract emanating from the chamber V after it has been passed through a reheater by means of a pump. The extract emanating from the chamber III is collected;

(d) in countercurrent in two stages with steam distillation. The chamber III is fed with steam and the chamber VII with extraction water. The extracts emanating from the chambers VII, IX and X are combined. The chamber V is fed with these extracts after they have been passed through a reheater by means of a pump. The extract emanating from the chamber V is collected.

The numerical details and the results of these extractions are shown below in the form of a Table:

|  | Example No. | | | | | |
| --- | --- | --- | --- | --- | --- | --- |
|  | 5 | 6 | 7 | 8 | 9 | 10 |
| Connection mode | (a) | (a) | (b) | (d) | (c) | (c) |
| d' roasted coffee (mm) | 0.5 | 0.4 | 1 | 1 | 0.6 | 0.6 |
| Feed rate of roasted coffee (kg/h) | 19 | 17 | 29 | 58 | 24 | 13 |
| With or without compacting | without | without | without | without | with | with |
| Thickness of bed (cm) | 2 | 2 | 2 | 2 | 2 | 2 |
| Total extraction time (including steam distillation for (b) and (d)) | 60 s | 60 s | 40 s | 20 s | 60 s | 120 s |
| Chamber III - fluid | water | water | steam | steam | extr. | extr. |
| Temperature (°C.) | 95 | 96 | 100 | 100 | 91 | 92 |
| Pressure on entry (atms gauge) | 0.2 | 0 |  |  | 2 | 1.8 |
| Throughput (kg/h) | 36 | 36 | 6 | 10 |  |  |
| Chamber V - fluid | water | water | water | extr. | extr. | extr. |
| Temperature (°C.) | 100 | 96 | 85 | 96 | 91 | 91 |
| Pressure on entry (atms gauge) | 0.2 | 0 |  |  | 3.4 | 3.5 |
| Throughput (kg/h) | 36 | 36 | 270 |  |  |  |
| Chamber VII - fluid | water | water | water | water | water | water |
| Temperature (°C.) | 99 | 95 | 100 | 97 | 92 | 91 |
| Pressure on entry (atms gauge) | 0.1 | 0 |  |  | 4.7 | 4 |
| Throughput (kg/h) | 48 | 48 | 100 | 360 | 198 | 150 |
| Extract collected: |  |  |  |  |  |  |
| Quantity (kg/h) | 95 | 67 | 258 | 316 | 133 | 119 |
| concentration (%) | 3.33 | 2.92 | 1.37 | 2.50 | 4.06 | 2.9 |
| extraction level (%) | 16.9 | 11.3 | 12.2 | 15.2 | 24.8 | 26.6 |

The extracts obtained according to Examples 1 to 10 have the character of domestic coffee or tea.

We claim:

1. A process for preparing a coffee extract suitable for use in preparation of beverages comprising the steps of:
   (a) grinding roasted coffee into particles having a characteristic diameter according to Rosin, Rammler and Sperling of between about 0.25 mm and 2.0 mm;
   (b) forming a bed of the ground coffee between about 0.5 cm and about 15 cm thick;
   (c) continuously advancing said bed of ground coffee in a downstream direction past a first extraction station so that the advance of the bed carries said coffee past said first extraction station at a throughput rate of at least about 13 kg/hr; and
   (d) forcing a first aqueous liquid extraction medium through said bed at said first extraction station by maintaining a pressure gradient in such medium as said bed advances past such station to form a first extract, the flow rate of such medium through said bed, expressed in kg/hr, being between about 2 times and about 20 times said throughput rate,
each portion of the coffee being extracted while in said bed for a total extraction time of between about 20 seconds and about 5 minutes.

2. A process as claimed in claim 1 in which said bed is formed on a surface by continuously applying said ground coffee to the surface while advancing the surface in said downstream direction.

3. A process as claimed in claim 2 in which said bed is formed on the outer surface of a cylindrical drum and such surface is advanced by rotating the drum about its axis.

4. A process as claimed in claim 3 in which said bed is formed by placing said ground coffee into compartments between walls on the surface of the drum which walls extend radially of the drum and parallel to the axis thereof.

5. A process as claimed in claim 4 further comprising the step of contacting the radially extending walls on the drum with sealing elements positioned outboard of the drum upstream and downstream of the first extraction station.

6. A process as claimed in claim 1 further comprising the step of continuously advancing said bed of coffee past a second extraction station postioned downstream of the first extraction station and forcing a second aqueous liquid extraction medium through the bed at said second extraction station as said bed advances past such station to form a second extract.

7. A process as claimed in claim 6 in which said second extract is utilized as the first liquid extraction medium at said first extraction station.

8. A process as claimed in claim 1 or claim 6 or claim 7 further comprising the steps of advancing the bed past a steam distillation station positioned upstream of the first extraction station, passing steam through the bed at such steam distillation station to strip aromatic constituents from the coffee and condensing the steam after its passage through the bed to collect the stripped aromatic constituents.

9. A process as claimed in claim 1 or claim 6 or claim 7 further comprising the step of forcing a gas through the bed of coffee to strip adhering extract from the coffee.

10. A process as claimed in claim 1 in which the temperature of said first extraction medium is maintained between about 70° C. and about 140° C. at said first extraction station.

11. A process as claimed in claim 1 in which said coffee is ground into particles having a characteristic diameter according to Rosin, Rammler and Sperling of between about 0.6 and about 0.9 mm.

12. A process as claimed in claim 1 in which said bed is formed to a thickness of between about 2 cm to about 5 cm.

13. A process as claimed in claim 1 in which said flow rate is between about 6 times and about 10 times said throughput rate.

14. A process as claimed in claim 1 or claim 6 or claim 7 further comprising the steps of recovering the coffee from the bed and further extracting the recovered coffee.

15. A process as claimed in claim 14 in which the recovered coffee is further extracted by treatment in a percolator.

16. A process as claimed in claim 1 in which said total extraction time is between about 1 minute and about 3 minutes.

17. A process for preparing a tea extract suitable for use in preparation of beverages comprising the steps of:
(a) forming a bed of particulate tea selected from the group consisting of broken tea leaves, ground tea leaves, tea leaf dust, tea stalk fragments and combinations thereof, the tea particles having dimensions on the order of a few tenths of a millimeter, the bed being between about 0.5 cm and about 15 cm thick;
(b) continuously advancing said bed of tea in a downstream direction past a first extraction station so that the advance of the bed carries the tea past said first extraction station at a throughput rate of at least about 5 kg/hr; and
(c) forcing a first aqueous liquid extraction medium through said bed at said extraction station by maintaining a pressure gradient in such medium as said bed advances past such station to form a first extract, the flow rate of such medium through said bed, expressed in kg/hr, being between about 5 times and about 30 times said throughput rate, each portion of the tea being extracted while in said bed for a total extraction time of about 1 minute to about 3 minutes.

18. A process as claimed in claim 17 further comprising the step of continuously advancing said bed of tea past a second extraction station positioned downstream of the first extraction station and forcing a second aqueous liquid extraction medium through the bed at said second extraction station as said bed advances past such station to form a second extract, said second extract being utilized as the first aqueous liquid extraction medium at said first extraction station.

* * * * *

UNITED STATES PATENT AND TRADEMARK OFFICE
CERTIFICATE OF CORRECTION

PATENT NO. : 4,534,985
DATED : August 13, 1985
INVENTOR(S) : Jacob Gasau

It is certified that error appears in the above—identified patent and that said Letters Patent is hereby corrected as shown below:

On the title page, in the abstract, line 7 "while a" should read -- whilst --.

Column 1, line 34, "coffe" should read -- coffee --.

Column 3, line 9, "fee" should read -- coffee --.

Column 4, line 1, "50 to 55%" should read -- 30 to 35% --.

Column 4, line 14, "in vacuo" should be italicized.

Signed and Sealed this

Third Day of December 1985

[SEAL]

Attest:

DONALD J. QUIGG

Attesting Officer    Commissioner of Patents and Trademarks